United States Patent [19]
Phillips

[11] 3,982,344
[45] Sept. 28, 1976

[54] AUDIO-VISUAL DISPLAY DEVICE

[76] Inventor: Calman P. Phillips, 1049 Park Ave., New York, N.Y. 10028

[22] Filed: July 27, 1972

[21] Appl. No.: 275,486

[52] U.S. Cl. .................................. 40/106.1; 40/281
[51] Int. Cl.² .......................................... G09F 13/10
[58] Field of Search ............................. 40/72–73.4, 40/102–104.19, 106.1, 28.1

[56] References Cited
UNITED STATES PATENTS

| | | | |
|---|---|---|---|
| 2,646,636 | 7/1953 | Gandee | 40/106.1 |
| 2,962,825 | 12/1960 | Bravo et al. | 40/106.1 |
| 3,253,358 | 5/1966 | Wright | 40/106.1 |

*Primary Examiner*—Edgar S. Burr
*Assistant Examiner*—A. Heinz
*Attorney, Agent, or Firm*—Hubbell, Cohen, Stiefel & Gross

[57] ABSTRACT

An audio-visual display device encased in two halves of an attache case, one half housing an illuminated window and a cassette tape recorder, the other half having provision for releasably holding a transparency magazine therein. The magazine includes a stiff backing member and a plurality of transparencies held together by a ring binder. Provision is made for permitting pivotal movement of the backing member away and toward the other half of the case when the backing member is releasably secured thereto to enable the folding under the backing member of transparencies that have been displayed.

10 Claims, 4 Drawing Figures

AUDIO-VISUAL DISPLAY DEVICE

BACKGROUND OF THE INVENTION

1. Field of the Invention

This invention relates to audio-visual display devices and particularly to audio-visual display devices which are highly portable.

2. The Prior Art

Audio-visual display devices are well known. Among such devices are direct illumination devices and overhead projection devices. It has also been known to supply transparencies in a hard cover book for convenient storage and display.

SUMMARY OF THE INVENTION

The audio-visual display device of the present invention is designed to fit in the two case halves of an attache case-like enclosure. As is well known, such a case is a relatively flat suitcase-like container. The opening in one half of the container is covered with a planar closure having a light transmitting window therein with a reflector therebeneath to itensify light originating from a light source such as an elongated bulb underlying the planar closure. Also disposed within the planar closure is a cassette tape recorder. In the other case half there is a contoured closure complementary to a projecting portion of the cassette tape recorder for receiving said portion for firm closure, nesting and holding. In addition the contoured closure is provided with a transparency receiving space and means for releasably holding a magazine of transparencies therewithin with the pivotal binding of the magazine adjacent the light conducting window in the other half. The magazine is provided with a single stiff backing member having complementary attachment means for releasably holding the book on the contoured member. The backing member is provided with a fold line adjacent the attachments means. The transparencies in the magazine can be held ready for display in a position above the backing member and can be pivoted one after the other into overlying relation with the window for display. A plurality of superposed transparencies may be so displayed. When it is desired to display a transparency not in superposed relation, the backing member may be lifted at the hinged end to cause it to pivot about its fold line, the transparencies on display may be swung underneath the backing member into the storage space, thereby freeing the window for reception of a single transparency that now constitutes the upper transparency of the magazine.

The timing of the display of the tranparencies may be controlled by a narrative on the tape cassette that is in playing relation with the cassette tape recorder disposed in the case.

DETAILED DESCRIPTION OF THE PREFERRED EMBODIMENT

Figure 1:
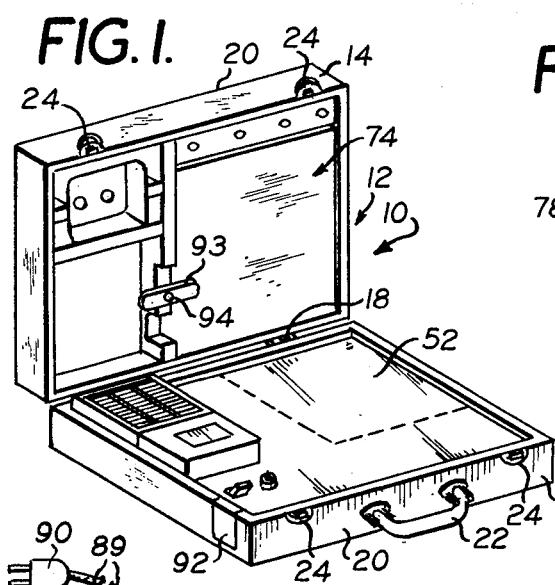
FIG. 1 is a perspective view of the audio-visual display device of the present invention with the case thereof partially open.
Figure 2:
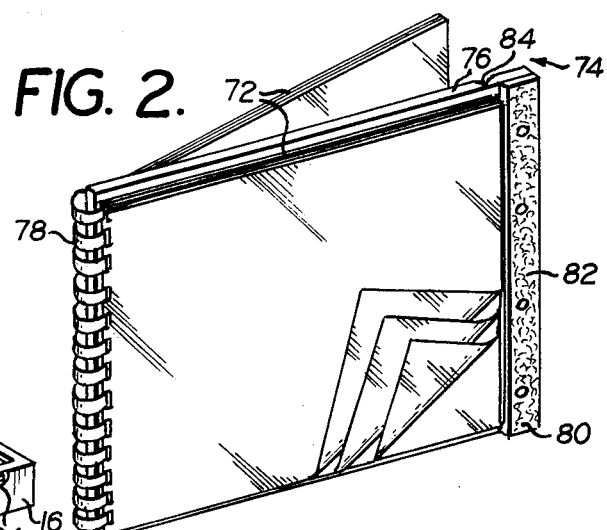
FIG. 2 is a perspective view of a transparency magazine for the audio-visual display device of FIG. 1.
Figure 3:
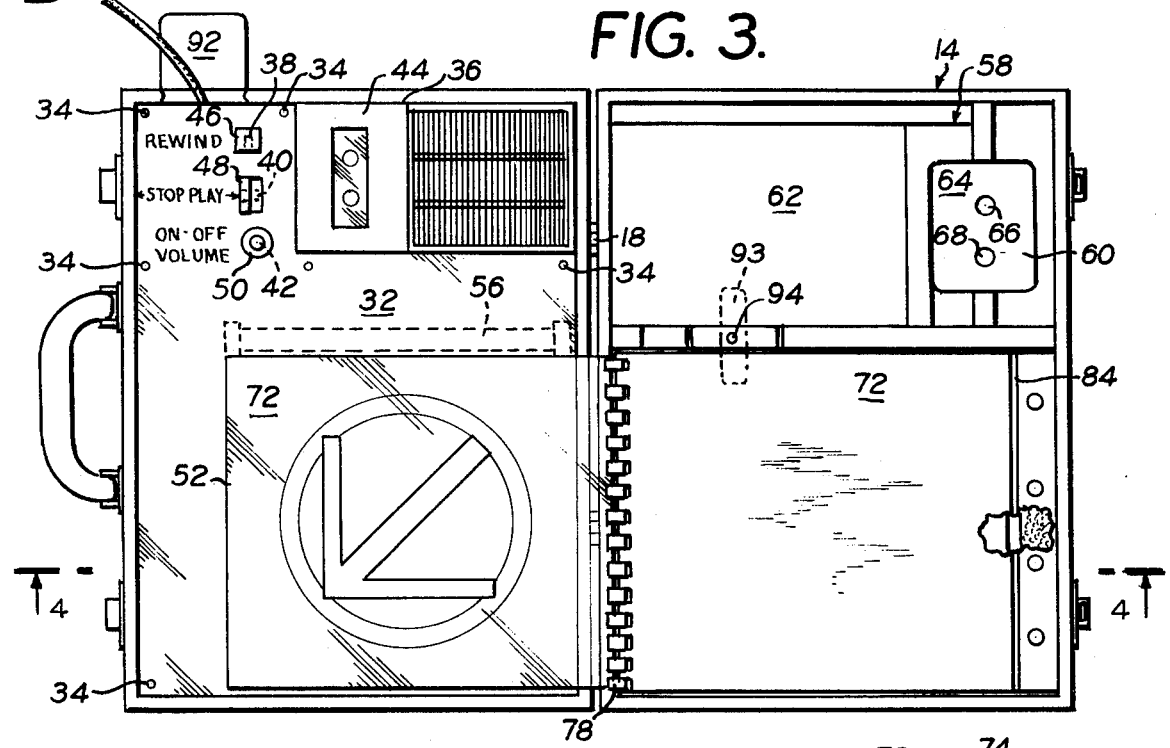
FIG. 3 is a top plan view of the audio-visual display device in open condition.
Figure 4:
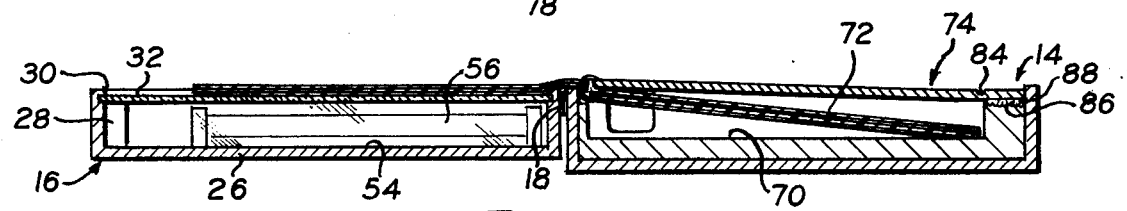
FIG. 4 is a sectional view taken along the line 4—4 of FIG. 3.

Referring now to the drawing in detail, the audio-visual device of the present invention is generally designated by the reference numeral 10 and includes a flat case-like enclosure 12 made up of two substantially congruent case or container halves 14 and 16. The two container halves 14 and 16 are hingedly mounted to one another as by hinges 18 so that they may be brought into overlapping or close confronting relation (not shown) and to an extreme open condition in which the two halves are coplanar, as shown in FIGS. 3 and 4. The end 20 of one of the halves, here shown as half 16, is provided with a handle 22 and the ends 20 of both of the case halves 14 and 16 are provided with complementary locking means 24 for holding the case in its closed condition.

Upstanding from the side 26 of case half 16 (oriented as the bottom in FIG. 4) are one or more bosses 28 which are fixed, as by adhesive, screws or the like to side 26. Overlying the bosses 28 and the entire opening 30 at the upper end of case half 16, as viewed in FIG. 4, is a light transmitting closure 32 that is secured to the bosses 28 and hence to the case half 16, as by screws 34. Closure 32 is provided with a plurality of cutouts or openings, designated herein as cutout 36, cutout 38, cutout 40 and cutout 42 which respectively receive in close fitting relation therewithin a cassette tape recorder 44, the rewind control 46 for the tape recorder, the stop-play control 48 for the tape recorder and the control 50 for turning on and off a lamp bulb 56 and tape recorder 44 as well as for controlling the volume of the tape recorder.

Underlying a rectangular portion of translucent closure 32, which portion will hereinafter be designated as window 52, is a reflector 54 which may be of any suitable design such as, for example, although not necessarily, that shown and described in U.S. Pat. No. Re24,728. Such a reflector is essentially parabolic and is associated with an elongated bulb 56 disposed at one end thereof, the reflector 54 serving to direct light upwardly over the entire window portion 52 to illuminate the entire area. Desirably, means are provided for preventing direct illumination of the closure 32 by the bulb 56, all of the light passing through the window area preferably being reflected off of the reflector 54.

It will be obvious to those skilled in the art that while the closure 32 is preferably made of one piece and is therefore light transmitting, such as translucent, this is not necessary. Thus, for example, the window portion 52 could be constructed separately of the remainder of the closure 32 and could be made of light transmitting material, for example translucent or transparent, and the remainder of the closure 32 could be made of a second piece that could be opaque, for example. However, the one piece structure described above is advantageous both from a structural and aesthetic viewpoint and is therefore preferred.

Disposed in the other case half 14 is a contoured member 58 that is preferably vacuum formed and pressed fit into the case half. The contoured member 58 has a marginal portion 60 that is substantially coplanar with the upper opening of case half 14. Contoured member 58 is provided with a large depression 62 for receiving the upper portions of the tape recorder 44 and its associated controls 46, 48 and 50 (which protrude above the upper surface of closure 32) without interference upon closing of the case 12. Contoured member 58 is also provided with a depression 64 having a pair of upwardly extending bosses 66 and 69 which are proportioned to receive a standard tape cassette (not shown) which tape cassette is useable on the cassette tape recorder 44. The cassette may be a spare cassette or may be the sole cassette caried with the device 10. In the portion of contoured member 58 confronting window 52 there is a relatively large depression 70 which, as will become more apparent hereinafter, serves as a receptacle for displayed or unwanted transparencies 72 forming part of a transparency magazine 74 to be now described.

Transparency magazine 74 includes a relatively stiff backing member 76 and a plurality of tansparencies 72 hingedly secured thereto as by a ring binder 78 or the like. Transparencies 72 have slightly less width as backing member 76 but their lengths are significantly less than that of the backing member whereby to leave exposed a marginal portion 80 of the backing member that is located on the opposite side from the ring binder 78. Secured to the marginal portion 80 of the backing member 76 is a detachable connecting means here shown to be a Velcro strip 82 although other suitable fasteners such as snap fasteners or the like may be employed. On the opposite surface of the backing member 76 and in the plane between the free ends of the transparencies 72 and the Velcro strip 82 there is a fold line 84 which permits the flexing or bending of the main part of the backing member 76 from the marginal portion 80 thereof. The reason for this will become apparent hereinafter.

Secured to that part of the marginal portion 60 of the contoured member 58 adjacent the page receiving space 70, which portion is hereinafter designated by the reference numeral 86, is a detachable securing means complementary to the means 82. Hence, in the preferred embodiment, the securing means is is a Velcro strip 88. Thus the transparency magazine 74 can be detachably secured to the device 10 by bringing the Velcro strip 82 into engagement with the Velcro strip 88 in which condition the ring binder or hinge conecting means 78 of the transparency magazine will be adjacent the window 52. The portion of the transparency magazine 74 closest to the window 52 is supported on the marginal edge portion 60 lying thereunder. Thus the backing member 76 will hold the transparencies 72 lying thereover in a substantially horizontal plane and approximately coplanar with the marginal portion 60 of the contoured member 58.

In the preferred embodiment of the invention, the transparencies 72 in the transparency magazine 74 are arranged in sequence so that when all of the transparencies overlie the backing member 76 the uppermost transparency is the one to be shown first. The remainder of the transparencies 72 underlying the uppermost are in the order to be displayed. An audio commentary related to the transparencies is provided by the cassette tape recorder 44 by inserting an appropriate tape cassette in the recorder 44 which cassette is related to the particular magazine 74 of transparencies 72. The audio portion may include an explanation of the transparencies and instructions to an operator when to advance them and in what sequence.

The uppermost transparency 72 can then be turned from the position overlying backing member 76 to a position overlying window 52. The supply cord 89 may be plugged into a standard house supply circuit and control 50 turned on to energize both tape recorder 44 and light bulb 56. To contain the cord 89 and its associated plug 90, there is a small compartment in the side of the case half 16 which compartment is closed by a hinged closure 92 in the side of case half 16. Naturally, in lieu of this arrangement, batteries may be provided in the case half 16 and the lamp 56 and the tape recorder 44 may be battery powered.

With the window 52 illuminated by lamp 56, and with the tape recorder 44 energized, the viewer will hear a commentary with respect to the uppermost transparency 72 and will then receive audio instructions to either superpose the second transparency 72 on the first transparency or to remove the first transparency and then place the second transparency over window 52. The superposition of two or more transparencies is easily accomplished by merely swinging additional transparencies 72 from their position overlying backing member 76 to the position overlying window 52 while keeping earlier transparencies in the position above window 52. However, when it is desired to substitute one transparency for another above window 52, then the transparency first overlying window 52 must be removed. In order to do this, the viewer may grasp the transparency magazine adjacent the ring binder 78 and lift the backing member 76 and those transparencies overlying it, which lifting movement is permitted by the fold line 84. With the backing member 72 so lifted, the transparency or transparencies overlying the window 52 may be folded under the backing member and the backing member may then be released to resume its horizontal position with the discarded transparencies now in the transparency chamber 70. Then a new transparency 72, now the uppermost transparency in the magazine, may be swung over from its position overlying backing member 76 to a position overlying window 52 for the display of said transparency. In this way, in accordance with the instructions on the tape cassette, the viewer may advance the transparencies singly, or sequentially in groups, or several at a time in groups, until the entire magazine has been viewed and the tape has run its course. At that time, all of the transparencies 72 will be in the transparency chamber 70. The user may then deenergize the device, unplug cord 89 and replace it in the cord chamber, close the cord chamber closure 92, and thus prepare the case for closing and storing.

It will be seen from the foregoing description that the capability of pivotally moving backing member 76 away from contoured member 58 is highly desirable. This capability stems from the inclusion of fold line 84 in backing member 76. Naturally other ways of obtaining this capability are available and will readily suggest themselves to the skilled art worker. Thus, for example, Velcro strip 88 could be secured to a plate that is pivotally mounted on margin 86 of contoured member 58; or complementary connectors, such as ball and socket connectors which permit pivotal movement could be employed.

Desirably, a means is provided for holding the backing member coplanar with the upper surface of case half 14 (as viewed in FIG. 4) when the case is closed. This means is simply an elongated locking member 93 which is pivotally mounted as by a pivot pin 94 for movement between a solid line position in which it is parallel to the adjacent edge of the backing member 76 and to and from a dotted line position wherein it overlies a portion of the backing member to thereby prevent pivotal movement of the backing member about fold line 84. When the locking member 93 is in its locked position, the case halves 14 and 16 may be pivoted about their hinges 18 to bring them into confronting relation in wich relation they may be locked by the locking means 24. Thereafter the user may pick up the case by the handle 22 and transport it as may be desired.

Thus it will be seen that I have provided an audio-visual display device which is convenient of use, which has provision for various modes of display of transparencies therein, and which is highly portable.

While I have herein shown and described the preferred form of the present invention and have suggested modifications thereof, other changes and modifications may be made therein within the scope of the appended claims without departing from the spirit and scope of this invention.

What is claimed is:

1. A display device comprising:
   a. a carrying case having two complementary case halves that are pivotally connected to one another for relative movement to and from a closed condition in which said halves are in close confronting relation and from and to an open condition in which said halves are substantially coplanar;
   b. a light transmitting member in one of said case halves, means underlying said light transmitting member for illuminating same;
   c. a transparency magazine including a backing member having a pair of spaced apart edges and a plurality of transparencies superposed thereon, means for hingedly mounting said transparencies to said backing member along corresponding substantially coplanar edges which includes one of said edges of said backing member;
   d. complementary connecting means on said backing member adjacent the other of said edges of said backing member and operatively connected to the other half of said case for releasably securing said backing member to said other half of said case with said hinged connecting means adjacent said light transmitting member when said case is in said open condition; and
   e. means for permitting pivotal movement of said backing member toward and away from said other half of said case, whereby transparencies overlying said backing member may be swung about said hinged connecting means into a display position overlying said light transmitting member and into a storage position underlying said backing member.

2. The display device as in claim 1, wherein said light transmitting member is a planar transluscent window.

3. Thhe display device as in claim 2, wherein said one case half has an opening which is in confronting relation with said other case half when said case halves are in close confronting relation, and further comprising a closure overlying the opening in said one case half that confronts the other case half when said halves are in close confronting relation, said closure being an integral translucent substantially planar member, and said window being a portion of said closure.

4. The display device as in claim 3, wherein said illuminating means comprises an elongated light bulb, and a reflector underlying substantially said entire window for reflecting light from said bulb upwardly through said window.

5. The audio-visual display device as in claim 3, further comprising audio reproduction means, the portion of said closure other than said window having an aperture for receiving said audio reproduction means, said audio reproduction means disposed within said aperture.

6. The audio-visual display device as in claim 3, further comprising audio reproduction means, the portion of said closure other than said window having an aperture for receiving said audio reproduction means, said audio reproduction means being partially disposed within said aperture and partially projecting above said closure, a contoured member disposed in said other case half, said contoured member having substantially planar elevated margins, the complementary connecting means operatively connected to said other half of said case being connected to a portion of said elevated margins most remote from said light transmitting member, said case and said transparency magazine being proportioned so that the part of said magazine closest to said light transmitting member is supported by the underlying elevated margin of said contoured member, said elevated margins defining a transparency container therebetween, said contoured member further having a depression therein for receiving said projecting part of said audio reproducing means when said case halves are in close confronting relation.

7. The audio-visual display device as in claim 6, said contoured member further having an elevated portion extending between said two aforementioned elevated marginal portions between said transparency container and said depression, and a locking member pivotally mounted on said elevated portion for movement into and out of overlying relation with said transparency magazine.

8. The audio-visual display device as in claim 7, wherein said illuminating means comprises an elongated light bulb, and a reflector underlying substantially said entire window for reflecting light from said bulb upwardly through said window.

9. The display device as in claim 1, a contoured member disposed in said other case half, said contoured member having substantially planar elevated margins, the complementary connecting means operatively connected to said other half of said case being connected to a portion of said elevated margin most remote from said light transmitting member, said case and said transparency magazine being proportioned so that the part of said magazine closest to said light transmitting member is supported by the underlying elevated margin of said contoured member, said elevated margins defining a transparency container therebetween.

10. The display device as in claim 9, said contoured member further having an elevated portion extending between said two aforementioned elevated marginal portions and defining said transparency container therewith, and a locking member pivotally mounted on said elevated portion for movement into and out of overlying relation with said transparency magazine.

* * * * *